Patented Feb. 13, 1951  2,541,351

UNITED STATES PATENT OFFICE 2,541,351

2,2,4,4-TETRACYANO-PENTANEDIOL-1,5

Harry Gilbert, Cuyahoga Falls, Ohio, assignor to The B. F. Goodrich Company, New York, N. Y., a corporation of New York No Drawing. Application November 18, 1949, Serial No. 128,250

2 Claims. (Cl. 260—465.6)

This invention relates to a new chemical compound, 2,2,4,4-tetracyano-pentanediol-1,5 and to a method of preparing the same.

The condensation of aqueous formaldehyde with malononitrile in the presence of a basic catalyst has been studied by various workers. Ostling reported (Öfversigt of Finska Ventenskaps-Societetens Förhandl 57, Div. A, No. 11, 1-13, 1914-15) the obtainment from the condensation of a product melting at 206–207° C. which he thought was a polymer of vinylidene cyanide

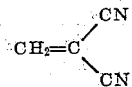

also called methylene malononitrile or 1,1-dicyano ethylene. Diels et al., however (Ber. 55, 3439, 1922, and Ber. 56, 2076, 1923), showed that the condensation as carried out by Ostling led to the formation of 1,1,3,3-tetracyanopropane (M. P. 137° C.) and 1,1,3,3,5,5-hexacyanopentane (M. P. 228°), and that no monomeric or polymeric vinylidene cyanide was secured. Consequently, the product melting at 206–207° C. obtained by Ostling was probably impure 1,1,3,3,5,5-hexacyanopentane.

Despite the inability to isolate monomeric vinylidene cyanide, Diels et al. postulated that it may have been an intermediate in the formation of 1,1,3,3-tetracyanopropane and 1,1,3,3,5,5-hexacyanopentane, as follows:

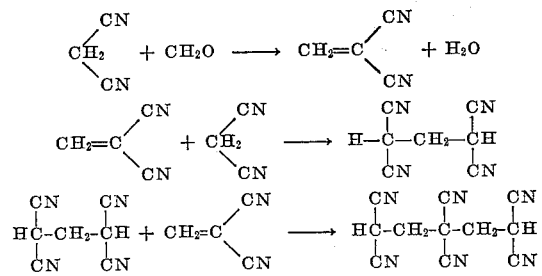

My investigations of the condensation of malononitrile with aqueous formaldehyde in presence of basic catalysts have confirmed the work of Diels et al. as to the nature of the products obtained, that is, 1,1,3,3-tetracyanopropane and 1,1,3,3,5,5-hexacyanopentane; but the fact that monomeric vinylidene cyanide has now actually been prepared and found to polymerize spontaneously in presence of water (see U. S. Patent 2,476,270) completely invalidates the Diels et al. postulation as to the mechanism of the condensation.

In further investigating the condensation of malononitrile with aqueous formaldehyde, I have now prepared and isolated 2,2,4,4-tetracyano-pentanediol-1,5, a lustrous white crystalline compound melting at 148–150° C. with evolution of formaldehyde. This compound has never been described in the literature or its existence postulated. Accordingly, it is the subject of the present invention.

The isolation of 2,2,4,4-tetracyano-pentanediol-1,5 strengthens the theory (set forth in my copending application Serial No. 128,249, filed November 18, 1949), that the condensation of malononitrile with formaldehyde proceeds by a mechanism involving the formation of methylol compounds as intermediates. Thus, one may postulate that malononitrile first reacts with formaldehyde (which in water has the probable structure: HO—CH₂—OH) as follows:

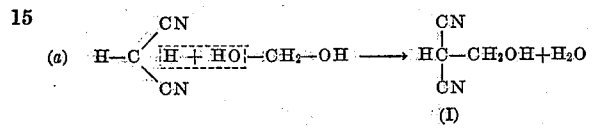

In theory the intermediate methylol compound (I) can then react either with malononitrile or aqueous formaldehyde as follows:

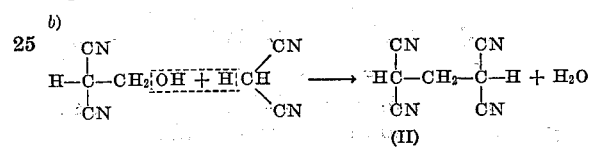

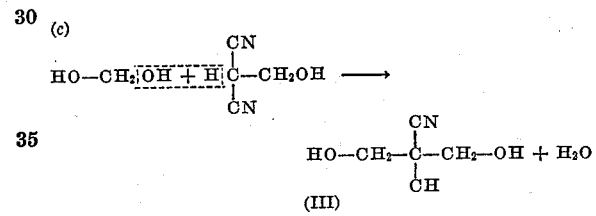

Similar reactions involving additional molecules of reactants should lead to the formation of

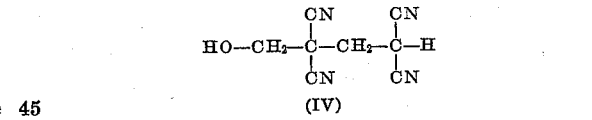

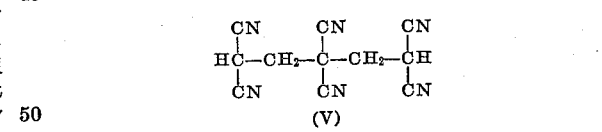

and

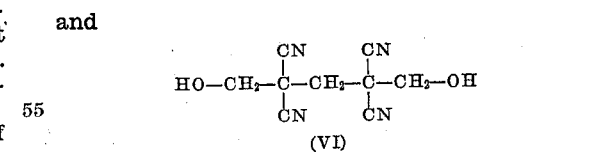

Compounds (II) and (V) are produced (as first shown by Diels et al.) by condensing malononitrile and aqueous formaldehyde at low temperatures in presence of a basic condensation catalyst (e. g. pyridine). As set forth in my copending application Serial No. 128,249, filed November 18, 1949, I have produced compound (III) by condensing malononitrile with formaldehyde under anhydrous conditions.

The compound of this invention, 2,2,4,4-tetracyano-pentanediol-1,5 (compound (VI) above) is prepared by condensing malononitrile with aqueous formaldehyde in the absence of a catalyst (or under conditions equivalent to the absence of a catalyst such as in presence of a basic catalyst such as pyridine and in the additional presence of nitric oxide which neutralizes the catalyst). The temperature at which the reaction takes place is not critical, the reaction proceeding at temperatures as low as 0° C. and at temperatures as high as 100° C. The quantities of reactants are likewise not critical but highest yields are secured when using the stoichiometrically required three moles of formaldehyde to two moles of malononitrile.

The following examples illustrate the preparation.

Example 1

A solution was prepared containing 18.6 grams (0.28 mole) of malononitrile, 21.2 grams of 40% formalin (0.28 mole of formaldehyde) 120 ml. of water, 4 drops of pyridine and 20 drops of isoamyl nitrile (which liberates NO). The mixture was maintained at about 20° C. with intermittent external cooling for 30 minutes whereupon a precipitate had formed. The precipitate was filtered and dried and was found to weigh 7.8 grams. On recrystallization from a mixture of acetonitrile and benzene the precipitate was obtained as lustrous white crystals melting at 148–150° C. and identified as 2,2,4,4-tetracyano-pentanediol-1,5 (Analysis: Found C—53.2%; H—4.0%;

N—27.5%

N—27.5%; O(by difference)—15.8% corresponding substantially to the theoretical values).

Example 2

Malononitrile, formalin and water were mixed in the ratio of 2 moles of malonitrile to three moles of formaldehyde. No catalyst was added. The mixture was heated at 100° C. for several minutes then the solution cooled to 0° C. whereupon was formed a precipitate which was filtered and found to consist of a good yield of 2,2,4,4-tetracyano-pentanediol-1,5 identified by analysis and by mixed melting point with the compound of Example 1. The filtrate on standing gave a further precipitate which was identified as 1,1,3,3,5,5-hexacyanopentane (M. P. 228° C.) thereby indicating the possibility of the reaction:

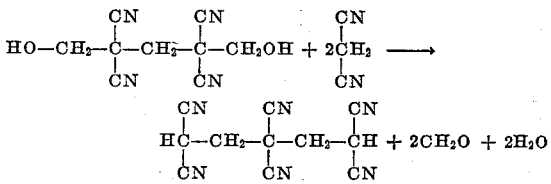

2,2,4,4-tetracyano-pentanediol-1,5 is useful as an intermediate in the preparation of other compounds as has been indicated hereinabove. It is also useful in generating formaldehyde in situ since it evolves formaldehyde on application of heat. It is also useful in the formation of synthetic resins and as a fungicide, insecticide and bactericide.

I claim:

1. 2,2,4,4-tetracyano-pentanediol-1,5.
2. The method which comprises reacting malononitrile with aqueous formaldehyde in the substantial absence of added materials, and separating the resulting 2,2,4,4-tetracyano-pentanediol-1,5 from the reaction mixture.

HARRY GILBERT.

No references cited.